(12) United States Patent
Brinza et al.

(10) Patent No.: US 10,776,565 B2
(45) Date of Patent: Sep. 15, 2020

(54) CONTEXT AWARE CASCADE OPERATIONS

(71) Applicant: Microsoft Technology Licensing, LLC, Redmond, WA (US)

(72) Inventors: Bogdan Brinza, Seattle, WA (US); Rossen Atanassov, Bellevue, WA (US); Kevin M. Babbitt, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/823,332

(22) Filed: Nov. 27, 2017

(65) Prior Publication Data

US 2019/0163729 A1    May 30, 2019

(51) Int. Cl.
| | | |
|---|---|---|
| *G06F 40/14* | (2020.01) | |
| *G06F 16/957* | (2019.01) | |
| *G06F 40/103* | (2020.01) | |
| *G06F 40/117* | (2020.01) | |
| *G06F 40/221* | (2020.01) | |

(52) U.S. Cl.
CPC .......... *G06F 40/14* (2020.01); *G06F 16/9577* (2019.01); *G06F 40/103* (2020.01); *G06F 40/117* (2020.01); *G06F 40/221* (2020.01)

(58) Field of Classification Search
IPC .................................. G06F 17/2247,17/30905
See application file for complete search history.

(56) References Cited

U.S. PATENT DOCUMENTS

| | | | | |
|---|---|---|---|---|
| 2004/0039993 A1* | 2/2004 | Kougiouris | ........... | G06F 17/211 715/237 |
| 2012/0110437 A1* | 5/2012 | Pan | ................... | G06F 17/30902 715/235 |
| 2015/0234798 A1* | 8/2015 | Mocanu | .............. | G06F 17/2247 715/236 |

* cited by examiner

*Primary Examiner* — Scott T Baderman
*Assistant Examiner* — Steve P Golden

(57) ABSTRACT

In one embodiment, a change to a format of user interface output being output in a user interface is received. Relationships between nodes in a document object model and rules in a style specification are analyzed to determine a context of the change with respect to first nodes in the document object model. The context indicates the change affects a format of the first nodes. Second nodes in the document object model that are associated with the cascade are identified based on the context. The cascade is applied to the second nodes and the first nodes by calculating the change in the format of the user interface output for the second nodes and the first nodes.

20 Claims, 12 Drawing Sheets

CONTEXT AWARE CASCADE OPERATIONS

BACKGROUND

When a browser renders a page, the browser computes formatting information for elements on the page. To compute the format on the page, the browser may parse a document including mark-up language that defines elements on the page and a cascade style sheet (CSS) that defines the presentation of the elements in the document. The browser generates a document object model (DOM) of nodes from the document and also styles from the CSS. The browser can apply the styles to the nodes to generate formatting information for the nodes. For example, the styles may select a background color and font size for nodes in the DOM.

The above process computes an internal browser representation of all applicable styles per node of the DOM. In the process, the formatting computation takes DOM nodes and styles defined in the CSS as input and produces node property values as an output. The computed format on each node is then stored and used in the rendering of the page for the document. Upon completing the above formatting computation, the property values stored on the elements are considered valid and can be used until a change makes these property values invalid. This may occur when any of the inputs of the formatting process, such as in the DOM or the styles, change in a way that require the formatting computed earlier to be invalidated and re-computed.

When the change occurs, the browser may identify a subtree in the DOM associated with the change, invalidate the formatting for all properties for the nodes in the subtree, and then re-perform the format computation for all the nodes of the subtree. Thus, the entire formatting is re-calculated to determine the computed format on each node of the subtree, which is a computationally intensive operation. In some examples, the nodes may have multiple property values applied, such as font size and background color. However, the change may not involve all the property values, such as only the background color may change. Even though only the background color changes, the browser invalidates the entire formatting on the node and recalculates the formatting for both the font size and the background color.

DETAILED DESCRIPTION

Figure 1:
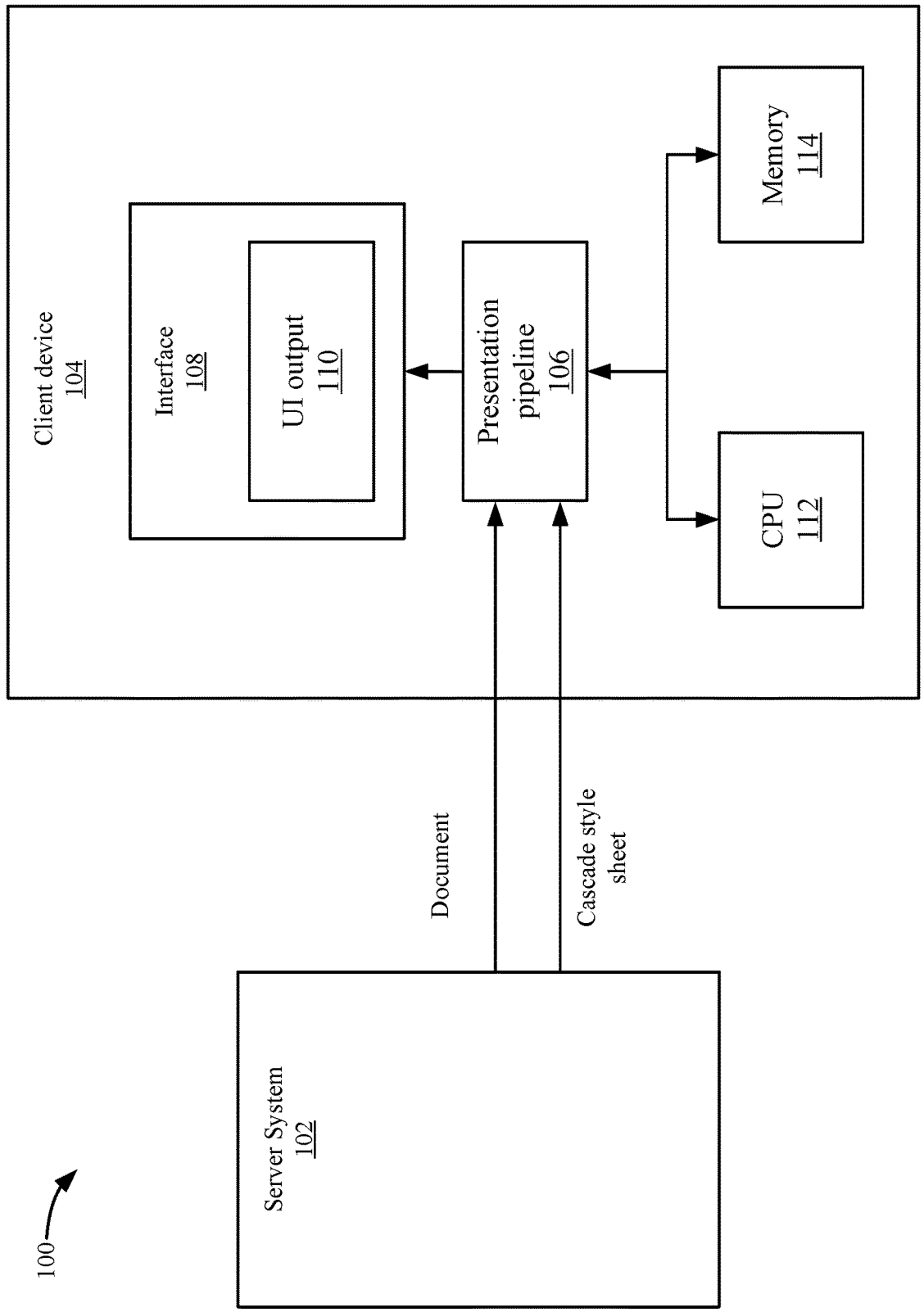
FIG. 1 depicts a simplified system for performing a context aware cascade according to some embodiments.

A user interface, such as a browser, outputs information, such as a page (e.g., a webpage) or audio, using a document and presentation information. To output the information, a presentation pipeline processes a document that defines elements to be displayed in the output, and a cascading style sheet (CSS) that defines the presentation of the elements in the output. To generate the output, the user interface may parse the document to generate a document object model (DOM) of nodes where the nodes correspond to the elements of the document. The nodes of the document object model are placed in a data structure, such as a hierarchical document tree. Also, the user interface parses the CSS and determines styles that can be used to format the nodes of the document object model. The styles may include rules that are used to apply formatting to the nodes. The formatting may include multiple properties, such as color, font size, and layout. The browser then computes the property values for the nodes using the styles. The property values are stored in memory, and the browser can re-use the property values when outputting information, such as rendering a page.

When a change occurs, such as to the DOM or styles, that causes a format on an element to become invalid, the browser may re-calculate the format on one or more nodes of the document object model based on the change. However, instead of invalidating a subtree of the document object model and re-calculating all the property values for the nodes as described in the Background, the user interface uses a context of the change to improve the performance of calculating the formatting change on the nodes. For example, the user interface uses the context and characteristics of the change to determine a first node in the document object model associated with the change. Then, from the context, the user interface determines whether or not a cascade is required. A cascade is where formatting calculations are performed on a parent node, then the children nodes, and so forth. For example, a change to a top-level node may cause the browser to recalculate a format on all the nodes of a subtree of nodes. However, there may be instances where a cascade does not need to be performed or the cascade can be stopped at a level of the document object model. Thus, the user interface determines whether or not the change needs to be cascaded to other nodes in the tree structure. If a cascade operation is not needed, then the user interface does not perform the cascade and the user interface does not re-calculate other nodes' property values that are not affected by the change. However, if a cascade should be performed, the user interface selectively identifies which nodes are affected by the change and then can perform cascade on those affected nodes to recompute the format on those nodes for the change. In this case, the cascade may start at a parent node, and proceed down the hierarchy to other nodes.

At some point in the cascade, the user interface can determine when the cascade can be stopped. For example, the user interface may determine that the formatting change does not affect nodes below a level of the document object model and the cascade is stopped at that level, which saves processing resources and also may display the content faster as unnecessary formatting calculations are not performed.

Also, the user interface determines what properties for the elements should be recomputed. Then, the user interface can perform the recomputation and if any properties for the nodes change, selectively apply the change to the properties in memory, such as by changing a value for the properties. For example, if the property values on a node are a font size and a background color, but the change only affects the background color, the user interface may only change the value of the background color in the computed property values stored for the element in the memory. Accordingly, all the stored property values on the node do not need to be re-computed. The above process saves processing time and also computing resources because all the property values on the nodes do not need to be recomputed again.

System Overview

FIG. 1 depicts a simplified system 100 for performing a context aware cascade according to some embodiments. System 100 includes a server system 102 and client device 104. Client device 104 may include a user interface 108, such as a browser (e.g., a web browser), that can output user interface (UI) output 110. UI output 110 may be a page, such as a webpage, or other information, such as audio. In some embodiments, to generate UI output 110, interface 108 may request a document and cascade style sheet (CSS) from server system 102. Although a request to server system 102 is described, it will be understood that client device 104 does not need to send a request to server system 102 to receive the document and cascade style sheet. For example, the document and cascade style sheet may be stored at client device 104.

The document may define elements using a language, such as a mark-up language. In some examples, the document may define elements in a webpage. However, the document may define elements in other media, such as audio. The cascading style sheet may define a presentation for the document, such as a visual style of UI output 110. The cascading style sheet enables the separation of presentation and content and can define aspects of formatting, such as the layout, colors, and fonts.

A presentation pipeline 106 receives the document and cascade style sheet and can generate UI output 110 in interface 108. Presentation pipeline 106 may be part of logic found in interface 108 or may be separate from interface 108 and will be described in more detail below.

When a change occurs that affects the formatting of UI output 110, presentation pipeline 106 may process the change in a resource- and memory-efficient manner using a context of the change. As will be described in more detail below, presentation pipeline 106 may use CPU resources 112 to determine which nodes in the document object model are affected by the change. Presentation pipeline 106 determines the context of the change based on which nodes are affected. Using the context and also possibly characteristics of the change, presentation pipeline 106 can determine whether or not a cascade needs to be performed. If not, then presentation pipeline 106 can avoid performing the cascade, which saves usage of CPU resources 112. However, if a cascade needs to be performed, presentation pipeline 106 uses the context and characteristics of the change to determine which nodes are affected by the cascade and what properties of the nodes need to be changed. Presentation pipeline 106 can then perform the cascade, but stop the cascade when a level in the hierarchy is reached in which no further nodes will be affected by the change. Also, presentation pipeline 106 may change only those property values in memory 114 for the nodes that are changed. Using the context when performing the cascade saves CPU resources 112 in stopping the cascade and not re-computing the property values for nodes that do not need to be re-calculated when performing the cascade. Also, memory 114 is more efficiently used as the format for property values other than the property that is being changed are not deleted and re-calculated. Memory 114 is also more efficiently used because presentation pipeline 106 may perform the context calculation in real time when the change has occurred. This avoids having to store extra information in memory 114 in an attempt to optimize the processing of changes.

Presentation Pipeline

Figure 2:
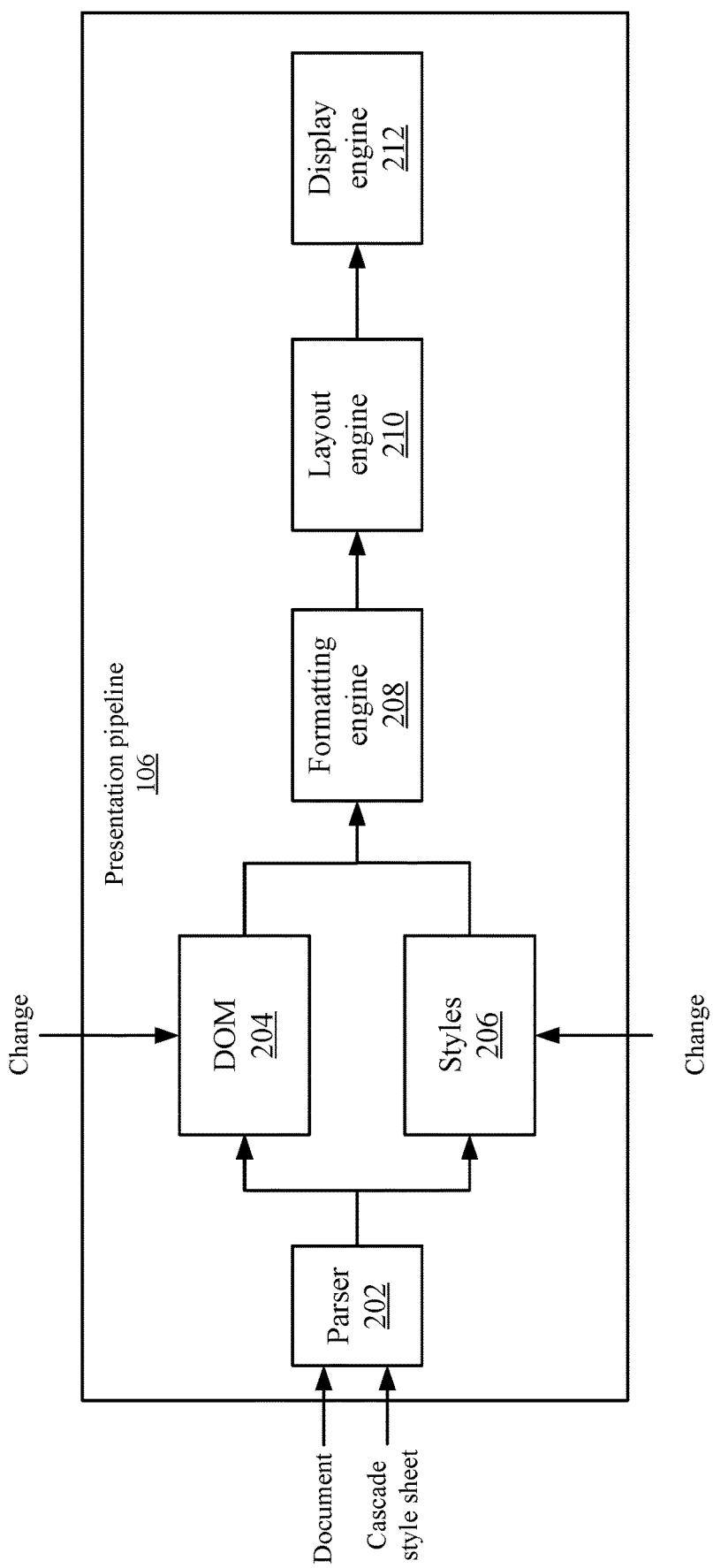
FIG. 2 depicts a more detailed example of a presentation pipeline according to some embodiments.

FIG. 2 depicts a more detailed example of presentation pipeline 106 according to some embodiments. A parser 202 receives the document and cascade style sheet and reviews the elements in the document and presentation information in the cascade style sheet to generate a document object model (DOM) 204 and styles 206. Parser 202 parses the CSS to generate styles 206, which may be different formatting styles that are applied to the nodes of DOM 204. For example, a formatting style may apply a font size or background color to nodes. Styles 206 may also include rules that may be used to apply the styles based on certain conditions occurring. For example, CSS may include a priority scheme to determine which styles apply if more than one rule matches a particular element. To determine which rules apply to nodes, the CSS includes a list of rules where each rule includes one or more selectors in a declaration box. The selectors declare which part of the nodes in the document object model in which a style applies by matching tags and attributes in the document for the nodes. The selectors are used to determine which rules are associated with which nodes. Different properties may apply to the nodes depending on which styles apply to which nodes.

Formatting engine 208 receives DOM 204 and styles 206 and can compute the property values for each element to be displayed in UI output 110. For example, formatting engine 208 may match style selectors to the nodes in DOM 204 and determine which rules apply to a node based on the priorities. Formatting engine 208 calculates the property values from the matched style rules for the nodes. For example, property values may include a font size of two pixels or a background color of green. Formatting engine 208 may store the property values with each node in DOM 204 in a data structure in memory 114.

Layout engine 210 can then determine the layout of the elements in UI output 110. The layout may be based on the structure of the nodes in the document object model and/or any layout properties from the computed format. Then, display engine 212 outputs UI output 110 using the layout and format that was computed. For example, display engine 212 may render a page with elements that correspond to nodes in the document object model.

Figure 3:
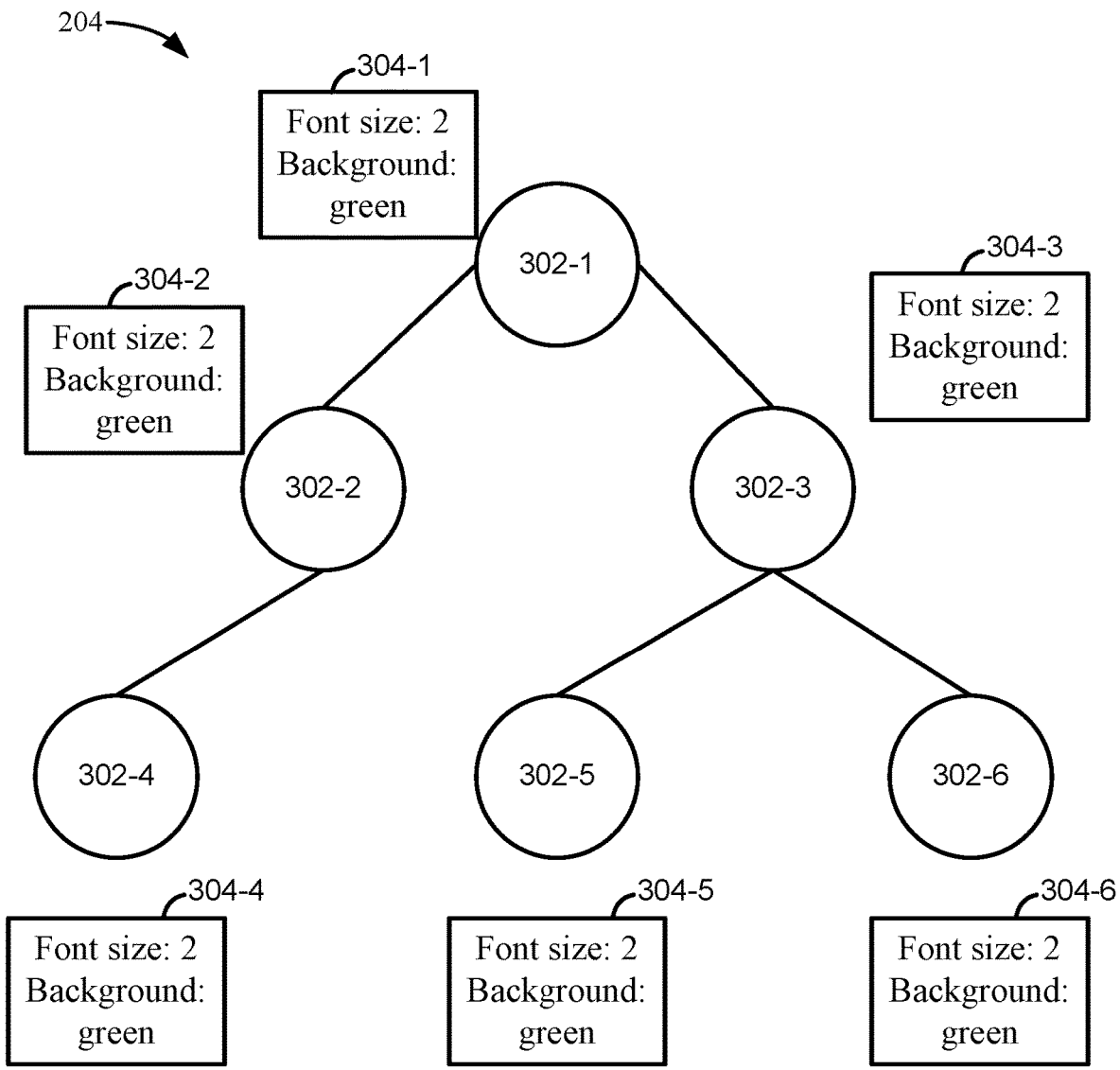
FIG. 3 depicts an example of a document object model with property values that are applied to the nodes according to some embodiments.

FIG. 3 depicts an example of DOM 204 with property values that are applied to the nodes according to some embodiments. DOM 204 includes nodes 302-1 to 302-6. In some examples, nodes 302-1 to 302-6 may be part of a subtree in DOM 204, such as the nodes may be associated with a container or other object in UI output 110. Nodes 302 may be interconnected in a hierarchical relationship. For example, 302-1 is a top-level node; 302-2 is a mid-level node connected to node 302-1; and node 302-4 is a leaf node connected to node 302-2. Similarly, nodes 302-2 and 302-3 are mid-level nodes that are connected to top-level node 302-1. Nodes 302-5, and 302-6 are leaf nodes that are connected to node 302-3. It is noted that other nodes may be connected below nodes 302-4, 302-5, and/or 302-6, but are not shown.

When performing a cascade, the cascade may start at a level, such as at top-level node 302-1, and cascade downward through lower levels, such as mid-level nodes 302-2 and 302-3 to leaf nodes 302-4, 302-5, and 302-6 via the connections. In some cases, a property value calculation may need to start at a parent node and cascade down to the hierarchy to descendant nodes. This may be because some property values depend on the formatting from ancestor nodes or are inherited from ancestor nodes, but other reasons for the cascade may be appreciated. The connections between nodes 302 determine the direction of the cascade. For example, node 302-2 may inherit some properties of node 302-1 and node 302-4 may inherit some properties of node 302-2.

Each node 302 may be associated with property values for formatting. For example, values for font size and background may be stored for each node 302-1 based on the rules that are applied in styles 206. As shown, formatting for nodes 302 are shown at 304-1 to 304-6, respectively. The same values for the font size and background of "2" and "green", respectively, are stored for each node, but different values for the nodes may be appreciated.

Figure 4:
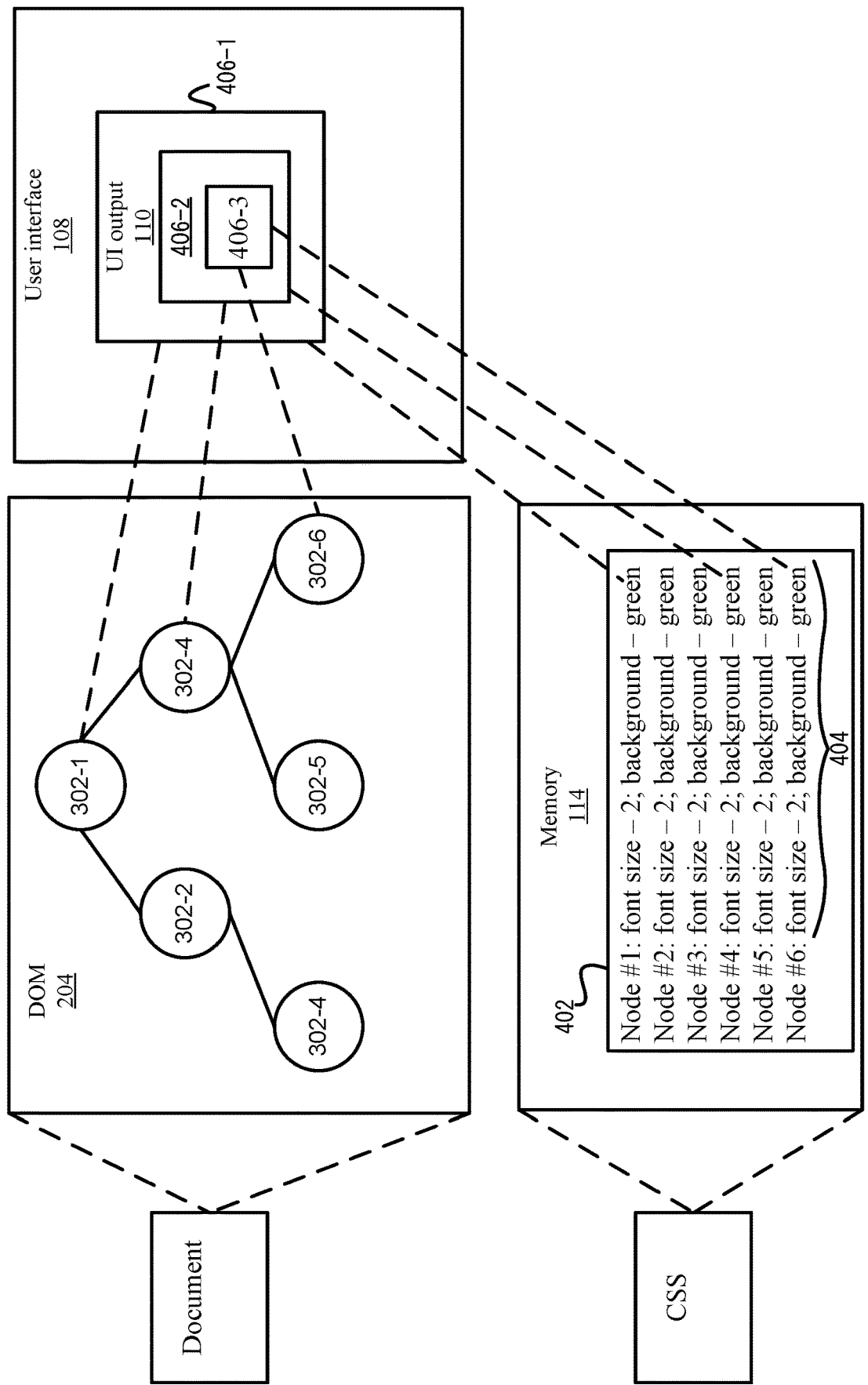
FIG. 4 depicts an example of applying the property values of nodes to generate user interface output according to some embodiments.

FIG. 4 depicts an example of applying the property values of nodes to generate UI output 110 according to some embodiments. Just as an illustrative example, nodes 302-1, 302-4, and 302-6 are shown in UI output 110. It will be understood that other nodes 302 from DOM 204 may generate other UI output, but are not shown.

Memory 114 stores a formatting data structure 402 that stores property values for nodes 302-1 to 302-6. For example, formatting information for nodes #1 to #6 correspond to nodes 302-1 to 302-6, respectively, in DOM 204. At 404, data structure 402 stores the property values for font size and background (BG) for each node.

In user interface 108, a first element 406-1 in UI output 110 corresponds to node 302-1. Also, the computed format for node #1 is applied to element 406-1. Node 302-4 corresponds to element 406-2 in UI output 110 along with the property values for node #2 in memory 114. Similarly, node 302-6 corresponds to element 406-3 in UI output 110 along with the property values for node #6 in memory 114.

Format Change Processing

Figure 5:
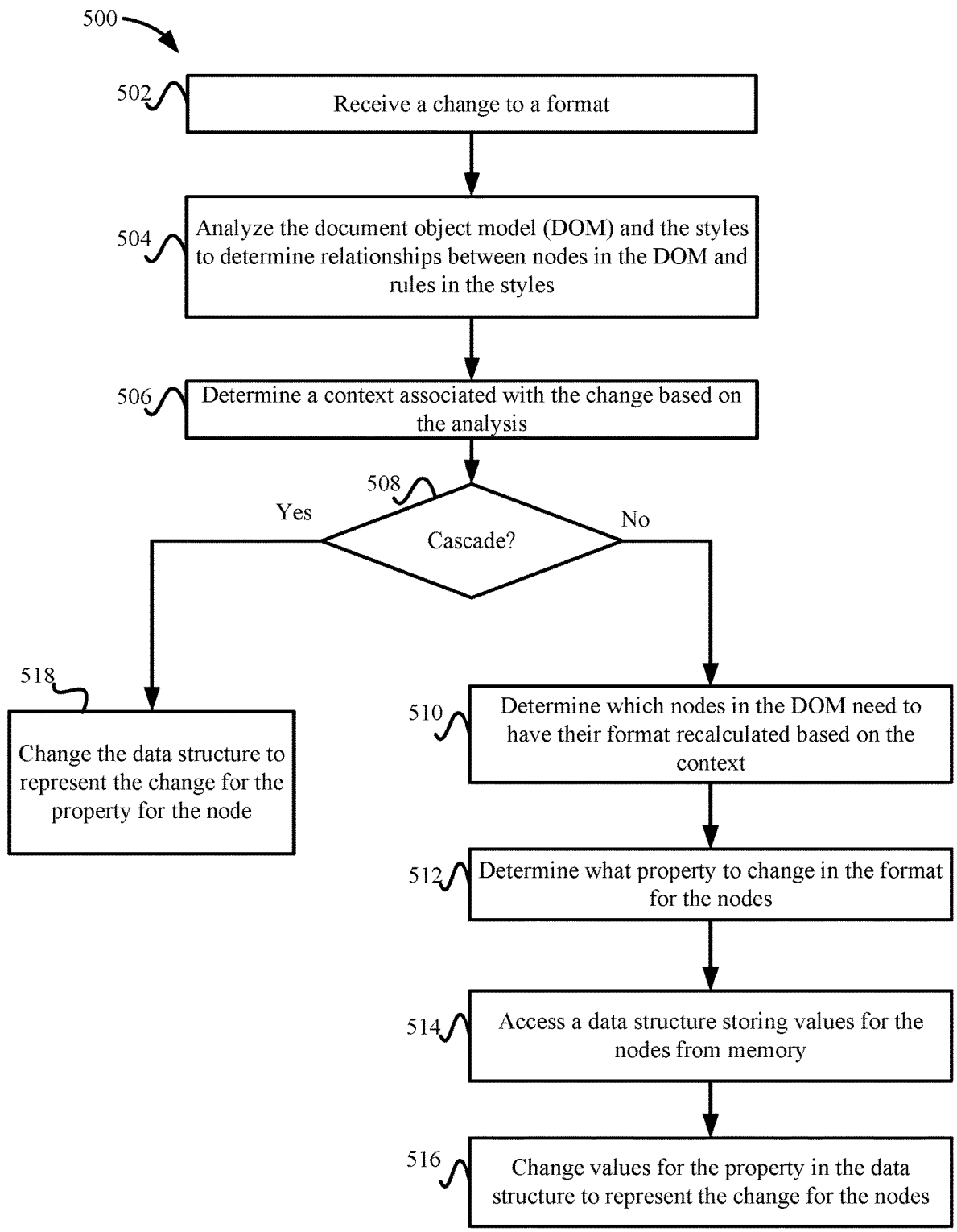
FIG. 5 depicts a simplified flowchart of a method for processing a change according to some embodiments.

At some point, a change occurs that may affect the formatting of UI output 110. For instance, a change may occur in DOM 204 and/or styles 206. Some possible changes include the addition or subtraction of nodes in DOM 204 or the changing of property values in styles 206, but other changes may occur. In some examples, a background color may be changed from a color of green to blue. FIG. 5 depicts a simplified flowchart 500 of a method for processing a change according to some embodiments. At 502, formatting engine 208 receives a change to a format. For example, the change may occur for one of the inputs to formatting engine 208, such as in the structure of DOM 204 or styles 206. Also, the change may occur due to an input on user interface 108 or by a programmatic change, such as a change to the document or cascade style sheet, which then in turn changes DOM 204 and/or styles 206.

Figure 6:
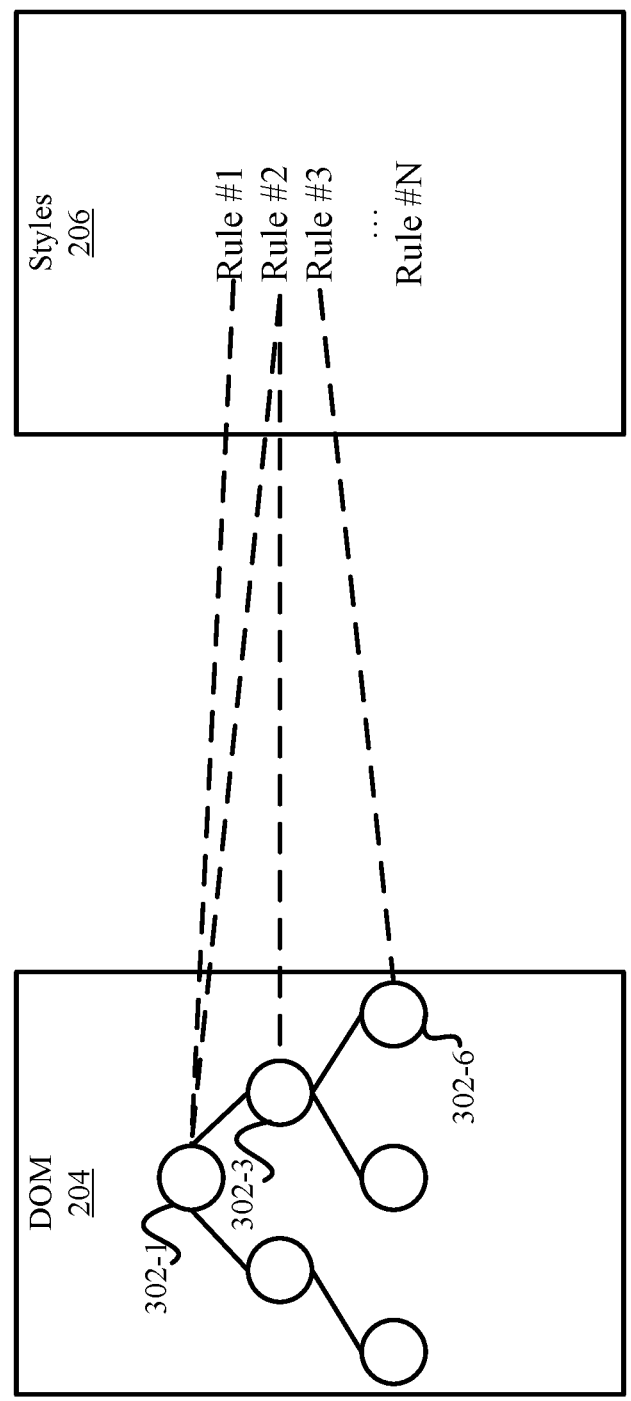
FIG. 6 depicts an example of the relationships between nodes in the document object model and rules in styles according to some embodiments.

At 504, formatting engine 208 analyzes DOM 204 and styles 206 to determine relationships between the nodes in the DOM and the rules in the styles. FIG. 6 depicts an example of the relationships between nodes in DOM 204 and rules in styles 206 according to some embodiments. Styles 206 may include multiple rules #1 to #N to define conditions that when met, select certain nodes 302. Formatting engine 208 evaluates the rules and determines when selectors for the rules match nodes 302. A single rule may include a selector that matches a single node or may match multiple nodes. Similarly, a node may be associated with one rule or multiple rules. Also, a node 302 may match multiple selectors for different rules for the same property. When this occurs and only one rule for the property should apply, formatting engine 208 uses the priority of the rules to determine which rule applies.

The selectors that match nodes 302 are shown using dotted lines in FIG. 6. For example, a rule #1 may apply to node 302-1. Also, node 302-1 may be associated with a second rule #2. Node 302-3 is associated with rule #2 also. Finally, rule #3 is associated with a node 302-6.

When a change occurs, formatting engine 208 may determine a subtree associated with the change (or the entire DOM may be used). The subtree may be defined by the change, such as the change may occur in a container that corresponds to a subtree of nodes. Then, formatting engine 208 dynamically calculates the selectors from styles 206 and DOM 204 to determine which rules match with which nodes 302. Formatting engine 208 performs the calculation by taking styles 206, DOM 204, and the change as input. Referring back to FIG. 5, upon calculating the applicable selectors for rules, at 506, formatting engine 208 can determine a context associated with the change. The context may identify the node or nodes affected by the change and the rules that apply to the change. Using the context and characteristics of the change, formatting engine 208 can determine whether or not a cascade is needed. In some examples, the context may indicate leaf nodes in the subtree are affected by the change; however, the characteristics of the change may include a structure that indicates the change is calculated on an ancestor node in the subtree. For example, inheritance is a mechanism by which properties are applied not only to a specified node but also to its descendants. For example, descendants of a parent node may inherit property values, such as descendant elements may inherit property values from any ancestor element that is enclosing them. Properties that can be inherited include color, font, and other formatting information. The inheritance may be an explicit inheritance, such as the usage of "inherit" keyword, or an implicit inheritance, such as property values that are inherited by default: color, font size, etc. The cascade may also be performed with dependencies between nodes where changes to a parent may cascade to other nodes and relative layout properties where changes to the parent may cause a cascade to other nodes.

The determination of whether to cascade or not may be classified as none, one level, or multiple levels. For example, none means that no changes are made to the format and no cascade is performed, one level means that the changes only occur on one level and no cascade is performed, and multiple levels means that the change occurs on multiple levels thus requiring a cascade. In some examples, only the top-level node may be affected by the change, which will only affect the element associated with this top-level node and does not cascade further. Further, some of the changes to mid-level nodes may only affect some of the mid-level elements, but the changes stop at the elements themselves without requiring any cascading. However, some changes on the nodes may force a cascade that touches other elements in other level in DOM 204, such as an ancestor node or descendant node (or a full cascade of all nodes). As discussed in the Background, the cascade nature of the format computation required that property values are computed for the entire subtree, such as a parent node and any descendants, even if some nodes were not affected. However, formatting engine 208 may stop the cascade whenever possible based on the context.

Referring back to FIG. 5, using the context and the characteristics of the change, formatting engine 208 may determine whether or not a cascade is necessary at 508. For example, formatting engine 208 may determine whether or not the change needs to be cascaded to other nodes 302 from above or below the node in DOM 204. For example, some changes require that formatting engine 208 start the property value calculation at an ancestor node and continue the calculation down the subtree.

If a cascade needs to be performed, at 510, formatting engine 208 determines which nodes in DOM 204 need to have their format recalculated based on the context and characteristics of the change. For example, based on the context and the change, formatting engine 208 determines where to start and end the cascade. In some examples, the change may apply to only one node. In this case, the change is not cascaded. However, in another example, the change may need to be calculated on multiple nodes in different levels, which requires that formatting engine 208 perform the format computation with multiple nodes requiring a cascade. Formatting engine 208 can then determine when to stop the cascade, such as by determining whether descendant nodes to the affected nodes need to have their format recalculated. The cascade may end on any level of the subtree, such as at the level of the affected nodes or at some level below the affected nodes.

Then, at 512, formatting engine 208 determines what property is changed in the format for the nodes. For example, only the background color may need to be changed for the nodes and not the font size. At 514, formatting engine 208 accesses data structure 402 from memory 114, which is storing the property values for nodes 302. In some embodiments, formatting engine 208 may not delete data structure 402 and re-calculate all property values for nodes or delete all property values for nodes that are affected by the change. For example, if the font size is not changing in the format, then formatting engine 208 does not delete the font size property value from memory 114.

At 516, formatting engine 208 changes values for the property in data structure 402 to represent the change for nodes 302. For example, formatting engine 208 changes the value for the background property in data structure 402 from green to blue. The value of the font size is not changed since that property is not affected by the change.

If the cascade is not required, at 518, formatting engine 208 changes the data structure 402 to represent the change for the property for the node. For example, the property value in data structure 402 may be changed, but a cascade does not need to be performed.

Memory Change

Figure 7:
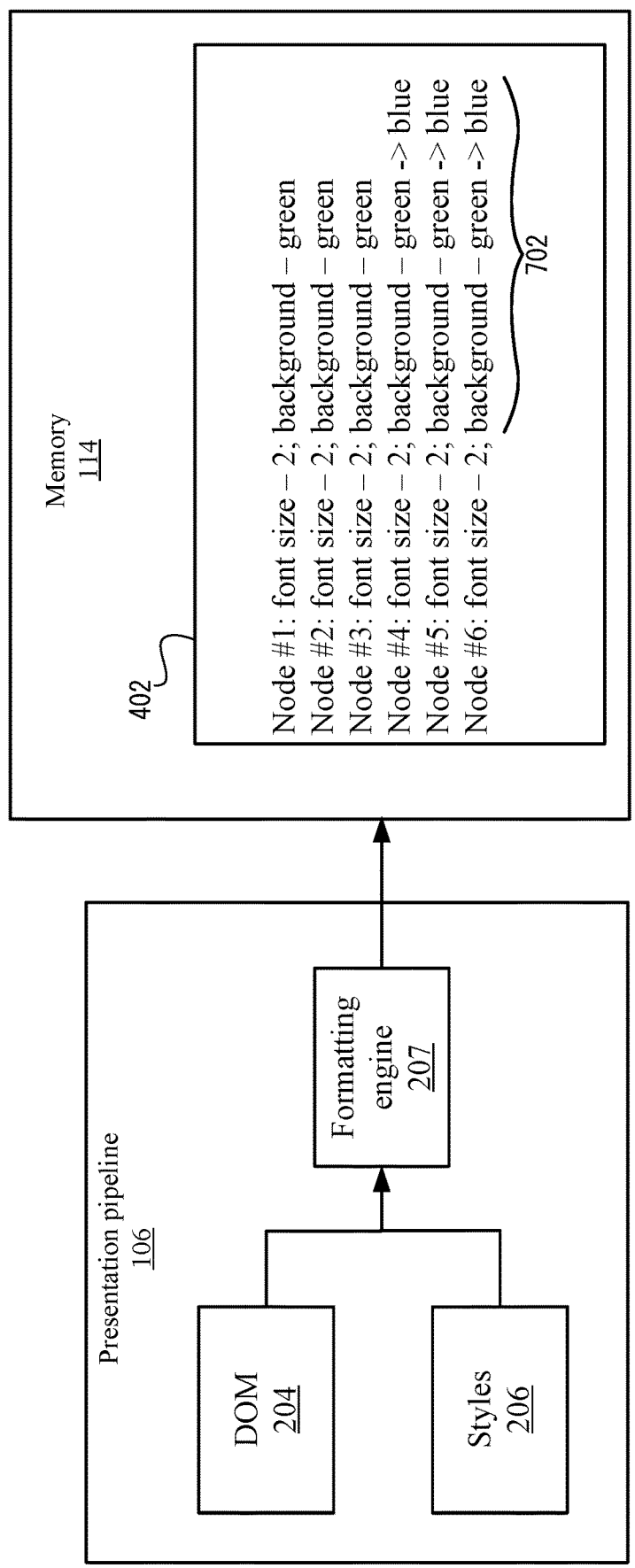
FIG. 7 shows an example of making a change to memory according to some embodiments.

FIG. 7 shows an example of making a change to memory 114 according to some embodiments. Formatting engine 208 receives DOM 204 and styles 206 and can perform the analysis of the rules in nodes 302 to determine the context. Then, once the nodes with property values that are affected by the change are determined, formatting engine 208 accesses data structure 402 and can then perform the change in data structure 402 for the background property in this example. For example, at 702, formatting engine 208 has changed the background color from green to blue for nodes #4, #5, and #6. In this example, the colors for nodes #4, #5, and #6 are changed from green to blue; however, it will be understood that all the colors for the background for all nodes may be changed, or other combinations of nodes may have their background property values changed. In some embodiments, the changing of the background color for nodes #4, #5, and #6 requires cascading of the format calculation from the top-level node to the leaf nodes. Formatting engine 208 may calculate the background color for the top-level and mid-level nodes, but those background colors do not change.

Context Examples

Figure 8A:
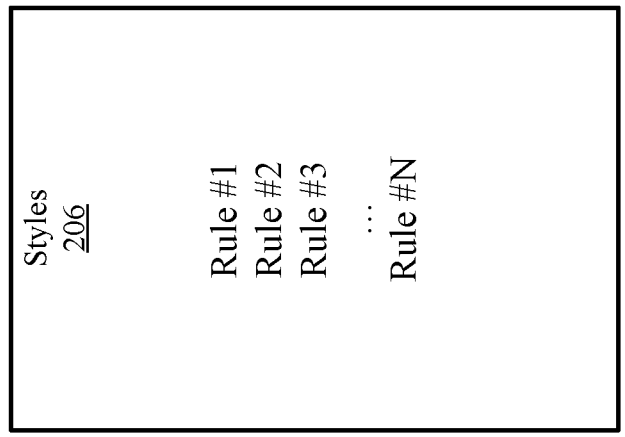
FIG. 8A shows an example where the context is associated with no nodes according to some embodiments.
Figure 8A:
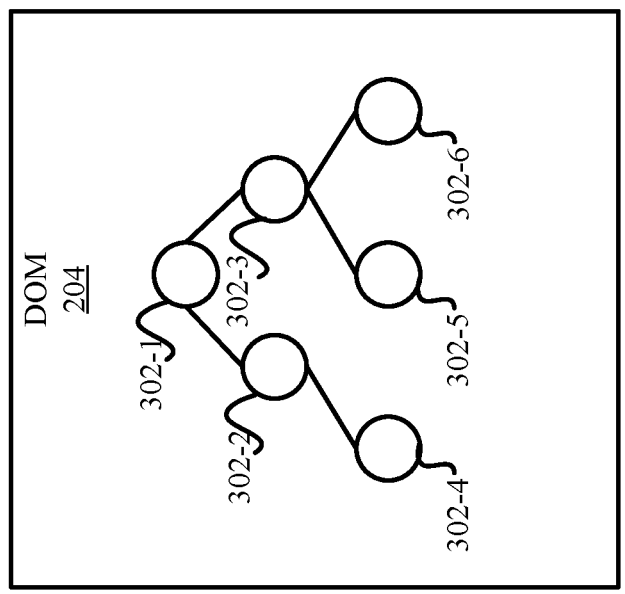

FIGS. 8A-8D show different examples for context for changes according to some embodiments. FIG. 8A shows an example where the context is that no nodes are affected by the change according to some embodiments. Formatting engine 208 may calculate the selectors for rules in styles 206 that are affected by the change. In this example, no rules affected by the change match nodes in DOM 204 and thus the computed format for nodes 302-1 to 302-6 is not invalidated or changed. After expending CPU resources 112 to calculate the selectors, formatting engine 208 does not use any more computing resources to invalidate or change the property values, which saves computing resources and also can render the change faster due to avoiding any cascade.

Figure 8B:
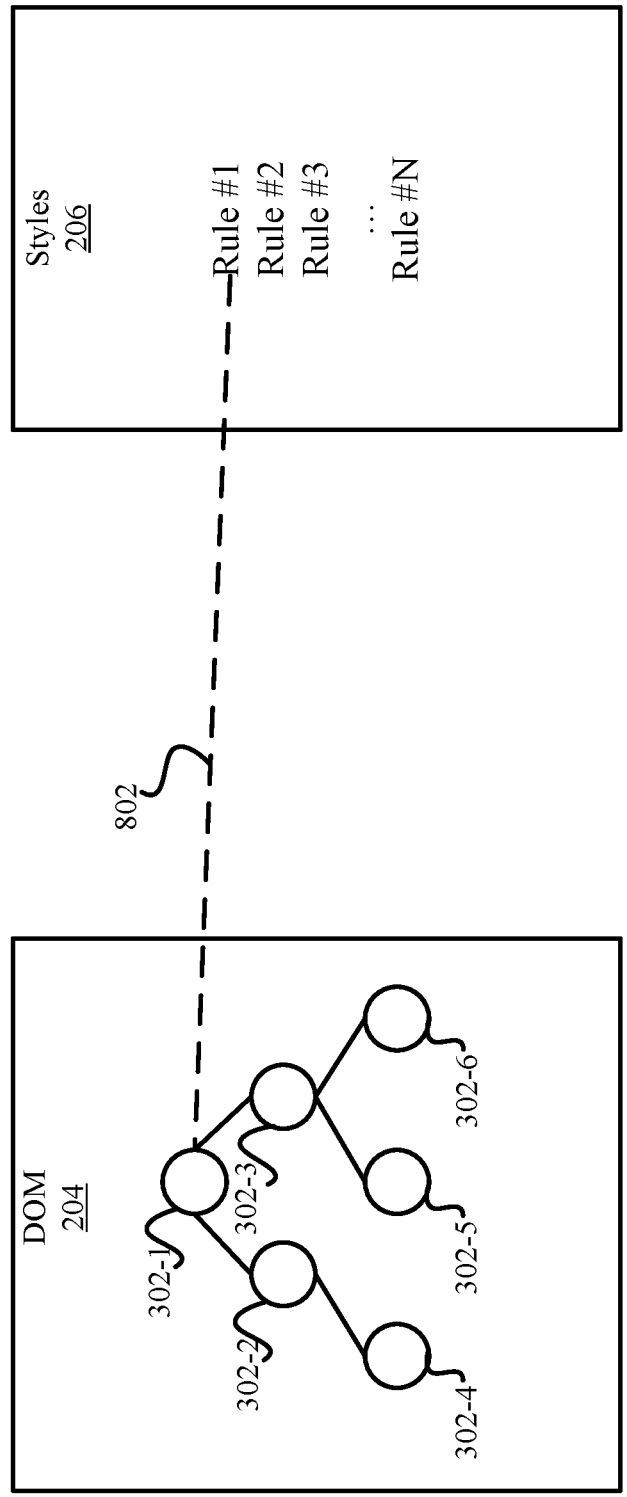
FIG. 8B shows an example where the context is associated with one node on a level according to some embodiments.

FIG. 8B shows an example where the context is associated with one node on a level according to some embodiments. At 802, a single selector matches node 302-1. Thus, rule #1 is the only rule that applies to the change. In this example, the context of the change only affects one node and is computed by the rule for that node. In this case, the cascade may be stopped at the first node. Thus, formatting engine 208 determines that a cascade does not need to be performed to other descendent nodes of node 302-1. However, formatting engine 208 may change the value of a property for node 302-1 in data structure 402. Also, formatting engine 208 does not invalidate the property values in data structure 402 and re-compute them for all nodes 302.

Figure 8C:
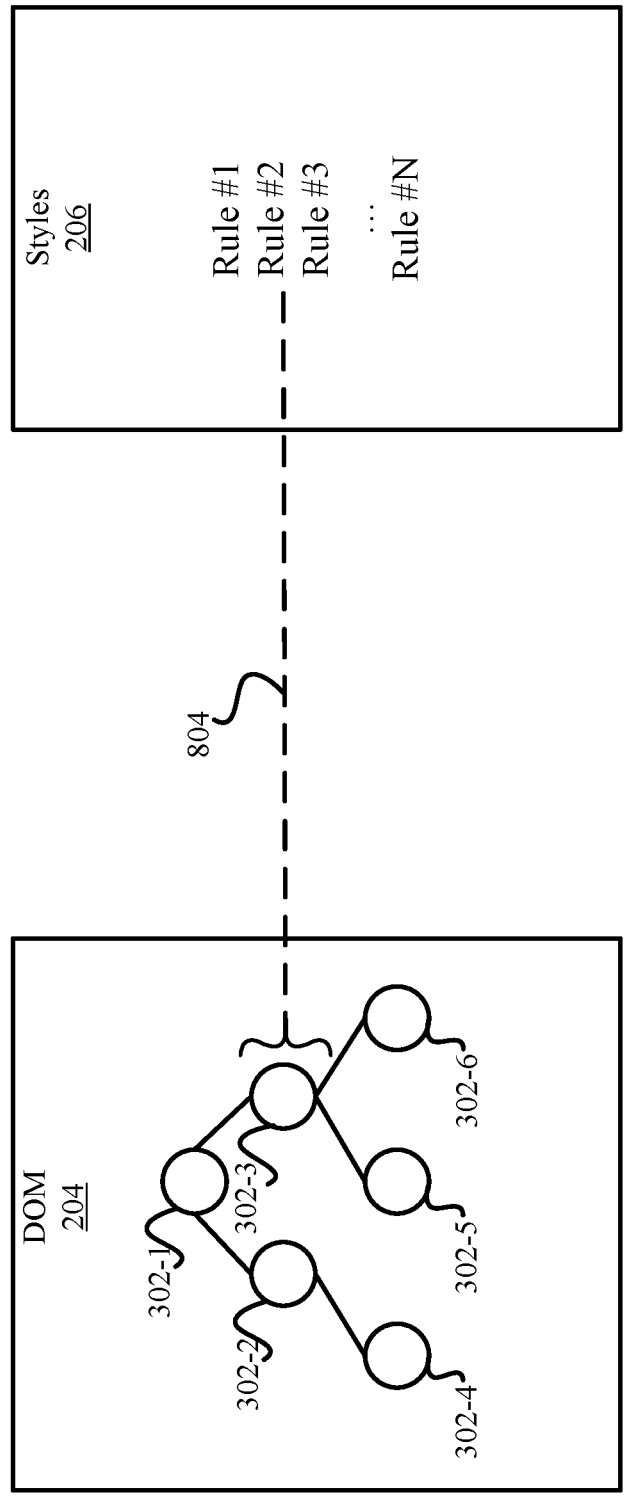
FIG. 8C shows an example when the context is associated with multiple nodes on a level according to some embodiments.

FIG. 8C shows an example when the context is associated with multiple nodes on a level according to some embodiments. In this example, formatting engine 208 determines that a selector 804 associated with rule #2 matches nodes 302-2 and 302-3 and only nodes 302-2 and 302-3 are affected by the change. The changes only affect the mid-level nodes, and the cascade can be stopped at these nodes. Accordingly, computing resources may be saved by not performing the cascade of the change to leaf nodes 302-4 to 302-6.

Figure 8D:
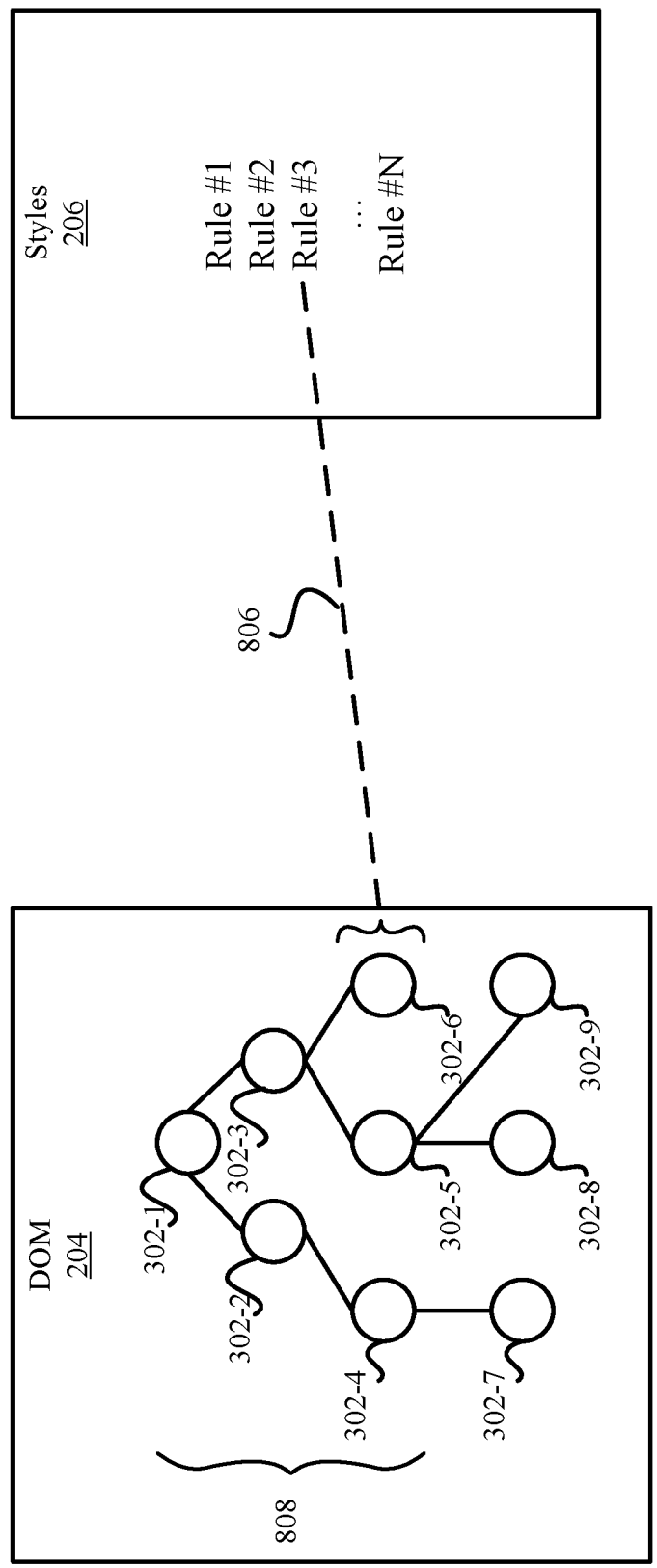
FIG. 8D shows an example for the context is associated with multiple levels of nodes according to some embodiments.

FIG. 8D shows an example for the context is associated with multiple levels of nodes according to some embodiments. In this example, formatting engine 208 computes selectors 806 for rule #3 that matches nodes 302-4, 302-5, and 302-6. In this example, a property for these nodes may be changed, which may cause a full cascade or forced cascade case because the change may need to be recalculated in other nodes in DOM 204, such as the change may need to be calculated for the ancestor nodes 302-1 to 302-3. The change needs to be cascaded from node 302-1 all the way down through nodes 302-2 and 302-3 to nodes 302-4 to 302-6. The cascade, however, may not proceed through all the nodes in DOM 204. For example, formatting engine 208 may stop the cascade at the level of nodes 302-4, 302-5, and 302-6. That is, formatting engine 208 does not recalculate any formats on nodes 302-7, 302-8, and 302-9.

Also, although a cascade is performed on some nodes 302, not all values may change and formatting engine 208 does not invalidate the property values that are not affected by the change for the nodes. For example, the property values for nodes 302-1, 302-2, and 302-3 may not be changed. Further, all the property values for nodes 302-4 to 302-6 may not be invalidated or re-calculated, but rather only a specific value for a property is changed.

Conclusion

Formatting engine 208 may use CPU resources 112 by calculating the selectors for the rules that apply to the change. However, the optimization of not having to perform the cascade or to limit the cascade to only nodes that are affected by the change uses less computing resources 112 in total compared to performing the cascade on all the nodes. Further, knowing the property to change in data structure 402 and not having to delete data structure 402 and re-calculate the entire format saves computing resources 112.

Accordingly, formatting engine 208 calculates a context that is used to determine whether a cascade should be performed and also what needs to be cascaded, such as what properties need to be cascaded. Further, formatting engine 208 may stop the cascade based on the context to save usage of computing resources 112. Also, computing resources 112 are saved by not having to re-compute the property values for all nodes 302. Rather, formatting engine 208 re-computes property values for the nodes that have only a property value change. The upfront cost of computing the selectors that match the nodes to determine the context may use less computing resources in total compared to having to re-calculate the property values based on the change for all nodes 302. Also, by not pre-calculating any optimization information before receiving the change, memory is saved in that any optimization information is not saved.

Example Computer System

Figure 9:
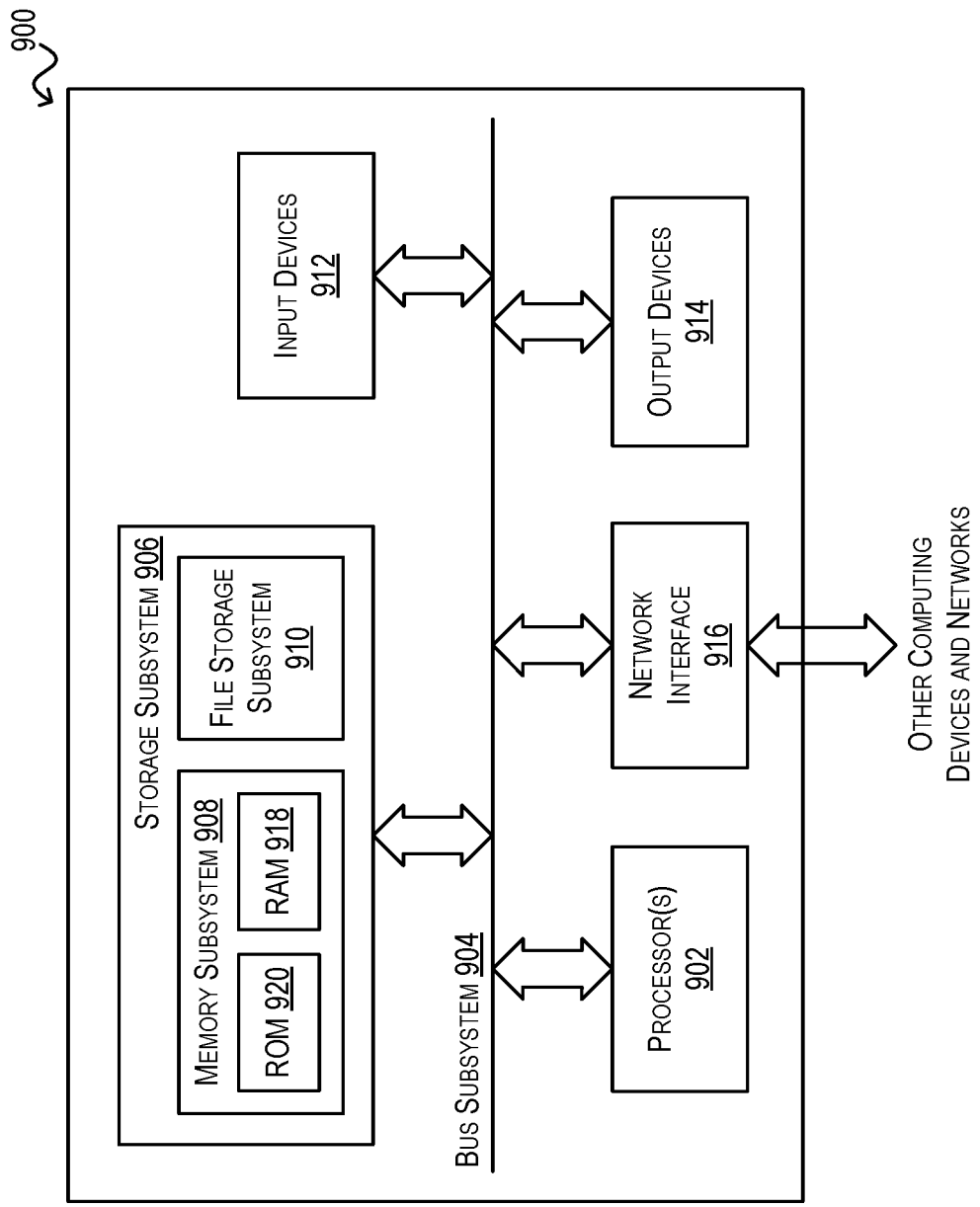
FIG. 9 depicts a simplified block diagram of an example computer system according to certain embodiments.

FIG. 9 depicts a simplified block diagram of an example computer system 900 according to certain embodiments. Computer system 900 can be used to implement any of the computing devices, systems, or servers described in the foregoing disclosure. As shown in FIG. 9, computer system 900 includes one or more processors 902 that communicate with a number of peripheral devices via a bus subsystem 904. These peripheral devices include a storage subsystem 906 (comprising a memory subsystem 908 and a file storage subsystem 910), user interface input devices 912, user interface output devices 914, and a network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., an Ethernet card, a Wi-Fi and/or cellular adapter, a modem (telephone, satellite, cable, ISDN, etc.), digital subscriber line (DSL) units, and/or the like.

User interface input devices 912 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 900.

User interface output devices 914 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 900.

Storage subsystem 906 includes a memory subsystem 908 and a file/disk storage subsystem 910. Subsystems 908 and 910 represent non-transitory computer-readable storage media that can store program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
a processor; and
a computer readable storage medium having stored thereon program code that, when executed by the processor, causes the processor to:
receive a change to a format of user interface output being output in a user interface, the user interface output being generated using a document object model and a style specification that specifies rules for formatting nodes in the document object model;

analyze relationships between the nodes in the document object model and the rules in the style specification to determine a context of the change with respect to one or more first nodes in the document object model, wherein the context indicates the change affects a format of the one or more first nodes;

identify a first level in the document object model to start a cascade and a second level in the document object model that includes the cascade, and a third level in which the change does not affect one or more third nodes in document object model after the second level of the document object model, wherein the third level is determined based on the context and characteristics of the change, and wherein the third level is used to determine to stop the cascade at the second level;

identify one or more second nodes in the document object model that were used to generate the user interface output based on the first level to start the cascade and the second level to end the cascade; and apply the cascade to the one or more second nodes that were used to generate the user interface output and the one or more first nodes by calculating the change in the format of the user interface output for the one or more second nodes and the one or more first nodes, wherein the one or more third nodes in document object model after the second level of the document object model do not have the change in the format calculated in the cascade.

2. The computer system of claim 1, wherein receive the change to the format comprises:
receive a user input on the user interface that causes the change in the format.

3. The computer system of claim 1, wherein receive the change to the format comprises:
receive a change to the document object model or the style specification that causes the change to the format.

4. The computer system of claim 1, wherein analyze the relationships between the nodes in the document object model and the rules in the style specification comprises:
determine selectors from the rules that match nodes in the document object model; and
use the selectors to determine the context of the change.

5. The computer system of claim 4, wherein analyze the relationships between nodes in the document object model and the rules in the style specification comprises:
determine a rule that is affected by the change; and
determine the one or more first nodes that are matched with the rule based on a selector for the rule.

6. The computer system of claim 5, wherein analyze the relationships between the nodes in the document object model and the rules in the style specification comprises:
determine the context of the change based on a position of the one or more first nodes in the document object model that match the selector.

7. The computer system of claim 1, wherein the one or more second nodes are on a different level than the one or more first nodes in the document object model.

8. The computer system of claim 1, wherein identify the third level comprises:
use the context to determine the one or more third nodes are not affected by the change and to stop the cascade at the second level.

9. The computer system of claim 1, wherein identify the third level comprises:
use characteristics of the change and the context to determine the one or more third nodes are not affected by the change and to stop the cascade at the second level.

10. The computer system of claim 9, wherein the characteristics of the change comprise a structure of the change in the styles.

11. The computer system of claim 1, wherein apply the cascade comprises:
determine a property to change for the one or more second nodes or the one or more first nodes.

12. The computer system of claim 11, wherein apply the cascade comprises:
change a value for the property for the one or more second nodes or the one or more first nodes in a data structure, wherein values for other properties for the one or more second nodes or one or more first nodes is not changed in the data structure.

13. The computer system of claim 12, wherein the value for the property for the one or more second nodes is not changed during the cascade.

14. The computer system of claim 1, wherein the one or more second nodes are in between the first level in the document object model to start the cascade and the second level in the document object model to stop the cascade.

15. A method comprising:
receiving, by a computing device, a change to a format of user interface output being output in a user interface, the user interface output being generated using a document object model and a style specification that specifies rules for formatting nodes in the document object model;

analyzing, by the computing device, relationships between the nodes in the document object model and the rules in the style specification to determine a context of the change with respect to one or more first nodes in the document object model, wherein the context indicates the change affects a format of the one or more first nodes;

identifying, by the computing device, a first level in the document object model to start a cascade and a second level in the document object model that includes the cascade, and a third level in which the change does not affect one or more third nodes in document object model after the second level of the document object model, wherein the third level is determined based on the context and characteristics of the change, and wherein the third level is used to determine to stop the cascade at the second level;

identifying, by the computing device, one or more second nodes in the document object model that were used to generate the user interface output based on the first level to start the cascade and the second level to end the cascade; and applying, by the computing device, the cascade to the one or more second nodes that were used to generate the user interface output and the one or more first nodes by calculating the change in the format of the user interface output for the one or more second nodes and the one or more first nodes, wherein the one or more third nodes in document object model after the second level of the document object model do not have the change in the format calculated in the cascade.

16. The method of claim 15, wherein analyze the relationships between nodes in the document object model and the rules in the style specification comprises:

determine selectors from the rules that match nodes in the document object model; and use the selectors to determine the context of the change.

17. The method of claim 15, wherein identify the third level comprises:

use the context to determine the one or more third nodes are not affected by the change and to stop the cascade at the second level.

18. The method of claim 15, wherein identify the third level comprises:

use characteristics of the change and the context to determine the one or more third nodes are not affected by the change and to stop the cascade at the second level.

19. The method of claim 15, wherein the one or more second nodes are in between the first level in the document object model to start the cascade and the second level in the document object model to stop the cascade.

20. A non-transitory computer readable storage medium having stored thereon program code executable by a computer system, the program code causing the computer system to:

receive a change to a format of user interface output being output in a user interface, the user interface output being generated using a document object model and a style specification that specifies rules for formatting nodes in the document object model;

analyze relationships between the nodes in the document object model and the rules in the style specification to determine a context of the change with respect to one or more first nodes in the document object model, wherein the context indicates the change affects a format of the one or more first nodes;

identify a first level in the document object model to start a cascade and a second level in the document object model that includes the cascade, and a third level in which the change does not affect one or more third nodes in document object model after the second level of the document object model, wherein the third level is determined based on the context and characteristics of the change, and wherein the third level is used to determine to stop the cascade at the second level;

identify one or more second nodes in the document object model that were used to generate the user interface output based on the first level to start the cascade and the second level to end the cascade; and apply the cascade to the one or more second nodes that were used to generate the user interface output and the one or more first nodes by calculating the change in the format of the user interface output for the one or more second nodes and the one or more first nodes, wherein one or more third nodes in document object model after the second level of the document object model do not have the change in the format calculated in the cascade.

* * * * *